US012770578B2

(12) United States Patent
Gou et al.

(10) Patent No.: US 12,770,578 B2
(45) Date of Patent: Oct. 20, 2026

(54) SOURCE DRIVING CIRCUIT AND ADJUSTING METHOD THEREFOR, AND DISPLAY PANEL

(71) Applicant: GLENFLY TECH CO., LTD., Shanghai (CN)

(72) Inventors: Fei Gou, Shanghai (CN); Bin Sheng, Shanghai (CN); Zhifeng Mao, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 0 days.

(21) Appl. No.: 19/341,933

(22) Filed: Sep. 26, 2025

(65) Prior Publication Data

US 2026/0171034 A1 Jun. 18, 2026

(30) Foreign Application Priority Data

Dec. 12, 2024 (CN) ......................... 202411839155.4

(51) Int. Cl.
*G09G 3/3275* (2016.01)

(52) U.S. Cl.
CPC ... *G09G 3/3275* (2013.01); *G09G 2300/0857* (2013.01); *G09G 2310/027* (2013.01); *G09G 2330/023* (2013.01)

(58) Field of Classification Search
None
See application file for complete search history.

(56) References Cited

U.S. PATENT DOCUMENTS

2018/0151593 A1* 5/2018 Inoue ................... G09G 3/3233
2024/0242651 A1* 7/2024 Tsuchi ...................... G09G 3/20
2024/0312428 A1* 9/2024 Tsuchi ................. G09G 3/3275

* cited by examiner

*Primary Examiner* — Parul H Gupta
(74) *Attorney, Agent, or Firm* — Nixon Peabody LLP

(57) ABSTRACT

A source driving circuit and an adjusting method therefor, and a display panel are provided. The source driving circuit includes: a DAC configured to obtain a grayscale value and convert the grayscale value into a grayscale voltage; a differential amplifier having a first input terminal connected to the DAC to obtain the grayscale voltage; a first bias circuit configured to apply a first bias tail current to the differential amplifier; a flip-flop connected to the DAC to obtain the grayscale value and a variation range of the grayscale value; and a second bias circuit connected to the flip-flop and configured to apply a second bias tail current to the differential amplifier in response to the variation range of the grayscale value satisfying a trigger condition.

17 Claims, 4 Drawing Sheets

SOURCE DRIVING CIRCUIT AND ADJUSTING METHOD THEREFOR, AND DISPLAY PANEL

CROSS-REFERENCE TO RELATED APPLICATION

This application claims priority under 35 U.S.C. § 119 to Chinese Patent Application No. 202411839155.4, filed with CNIPA on Dec. 12, 2024, entitled "SOURCE DRIVING CIRCUIT AND ADJUSTING METHOD THEREFOR, AND DISPLAY PANEL", the entire contents of which are incorporated herein by reference.

TECHNICAL FIELD

The present disclosure relates to the field of display panel technologies, and in particular, to a source driving circuit and an adjusting method therefor, and a display panel.

BACKGROUND

In the field of display driving, such as an active matrix organic light emitting diode (AMOLED) panel, a source amplifier is required to drive an entire column of pixel units to emit light. As the resolution and refresh rate of the AMOLED panel become higher and higher, the performance requirements for the source driving circuit become higher and higher. Higher resolution means more and more source driving channels and a large number of driving circuits. The higher the refresh rate is, the shorter the time required for the output of the source amplifier changes till being stable as the grayscale voltage changes. The above two aspects pose challenges to the design of the source driving circuit.

SUMMARY

In view of the problems mentioned in the background, it is necessary to provide a source driving circuit which at least can enhance the slew rate of the amplifier output and meanwhile avoid increasing the power consumption of the driving circuit.

In order to achieve the above object and other related objects, in one aspect of the present application, it is provided a source driving circuit, including:

- a Digital-to-Analog Converter (DAC), configured to obtain a grayscale value and convert the grayscale value into a grayscale voltage;
- a differential amplifier, where a first input terminal of the differential amplifier is connected to the DAC to obtain the grayscale voltage;
- a first bias circuit, which is configured to apply a first bias tail current to the differential amplifier;
- a flip-flop, which is connected to the DAC and configured to obtain the grayscale value and a variation range of the grayscale value; and
- a second bias circuit, which is connected to the flip-flop and configured to apply a second bias tail current to the differential amplifier in response to the variation range of the grayscale value satisfying a trigger condition.

In an embodiment, the flip-flop includes at least one determination unit, each determination unit including a first branch and a second branch in parallel. The first branch is provided with a delay unit, and the first branch and the second branch input to a logic unit.

In an embodiment, the flip-flop includes a single determination unit configured to determine a variation range of a highest bit of the grayscale value; or, the flip-flop includes two determination units configured to determine variation ranges of the highest bit and a second highest bit of the grayscale value, respectively.

In an embodiment, the trigger condition includes that the variation range of the grayscale value is varying between the first interval and the second interval of the grayscale voltage range.

In an embodiment, in response to the variation range of the grayscale value satisfying the trigger condition, an output signal of the flip-flop is switched from a low level to a high level, and when the output signal of the flip-flop is at the high level, the second bias tail current is applied to the differential amplifier. In response to the variation range of the grayscale value not satisfying the trigger condition, the output signal of the flip-flop is at the low level, and when the output signal of the flip-flop is at the low level, the second bias tail current is not applied to the differential amplifier.

In an embodiment, after the high level lasts for a preset duration, the output signal of the flip-flop is switched from the high level to the low level.

In an embodiment, in response to the variation range of the grayscale value satisfying the trigger condition, the flip-flop outputs a forward pulse with a width equal to a delay duration of the delay unit.

In an embodiment, a single forward pulse is configured to drive the second bias circuit to apply the second bias tail current to the differential amplifier for a single time, and a duration of applying the second bias tail current is equal to the delay duration.

In a second aspect, the present application provides a method for adjusting the foregoing source driving circuit, the method including:

- obtaining the grayscale value and the variation range of the grayscale value; and
- applying an additional bias tail current to the differential amplifier in response to the variation range of the grayscale value satisfying the trigger condition.

In a third aspect, the present application provides a display panel, including the source driving circuit described above.

According to the source driving circuit and the adjusting method therefor, and the display panel provided by the present disclosure, with the arrangement of the flip-flop and the additional bias circuit, when the variation range of the grayscale value satisfies the trigger condition, the additional bias tail current is applied to the differential amplifier, thereby increasing the bias tail current for the differential amplifier and enhancing the slew rate of the differential amplifier output. Meanwhile, since the increase of the bias tail current is only effective for the preset duration, the power consumption of the driving circuit is not additionally increased, so as to meet the requirements in both enhancing the slew rate and reducing the power consumption.

BRIEF DESCRIPTION OF THE DRAWINGS

To better describe and illustrate embodiments and/or examples of the application disclosed herein, reference may be made to one or more accompanying drawings. Additional details or examples for describing the drawings should not be considered as limitations to the scope of any of the disclosed application, the presently described embodiments and/or examples, and the presently understood best mode of the application.

Figure 1:
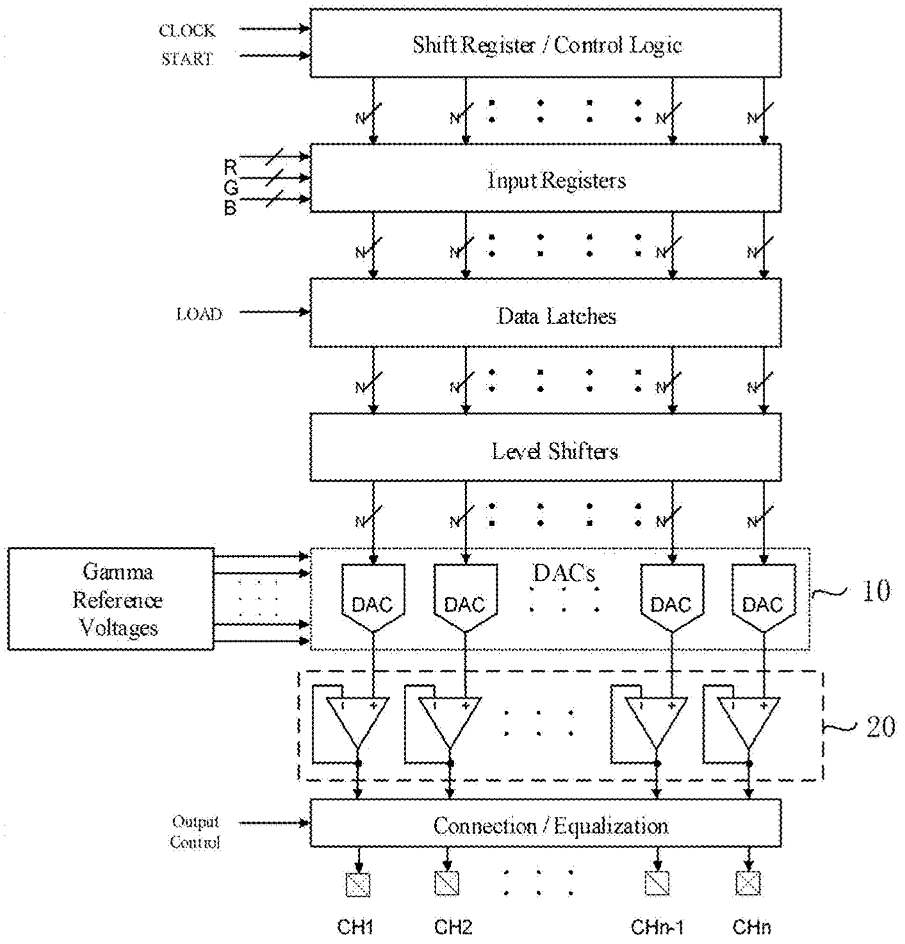
FIG. 1 is a schematic structural diagram of a source driving circuit for an AMOLED panel in related technology.

Reference numerals are explained as follows:

1: source driving circuit; 2: gate driving circuit; 3: pixel array unit;

10: Digital to Analog Converter; 20: differential amplifier; 30: first bias circuit; 40: flip-flop;

41: delay unit; 42: logic unit; 50: second bias circuit.

DETAILED DESCRIPTION

To facilitate understanding of the present disclosure, the present disclosure will be described more fully hereinafter with reference to the accompanying drawings. Preferred embodiments of the present application are given in the drawings. However, the present disclosure may be implemented in many different forms and is not limited to the embodiments described herein. On the contrary, these embodiments are provided to make the disclosure of the present application more thorough and comprehensive.

Unless defined otherwise, all technical and scientific terms used herein have the same meaning as commonly understood by one of ordinary skill in the art to which this application belongs. The terms used in the specification of the present application are only for the purpose of describing specific embodiments, and are not intended to limit the present application. As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "include" when used in this specification, specify the presence of stated feature, integer, step, operation, element, and/or component, but do not preclude the presence or addition of one or more other features, integers, steps, operations, elements, components, and/or groups thereof. As used herein, the term "and/or" includes any and all combinations of the associated listed items.

It should be noted that the drawings provided in the embodiments only illustrate the basic concept of the present disclosure in a schematic manner, although the drawings only show the components related to the present disclosure and are not drawn according to the number, shape and size of the components in actual implementation. The form, number and proportion of each component in actual implementation may be freely changed, and the component layout form may also be more complex.

FIG. 1 illustrates an architecture of a source driving circuit for an AMOLED panel. Under the control of a data latch control circuit, red, green and blue (RGB) image data is latched on data latches through registers. Under the control of each row of beat signals, a row of data is pushed to Digital-to-Analog Converters (DACs) through level shifters for being converted, and digital grayscale values are converted into nonlinear GAMMA voltage values. The GAMMA voltages are buffered in source amplifiers to improve the driving capability of grayscale voltages, thereby outputting large capacitive loads for driving the panel.

Figure 2:
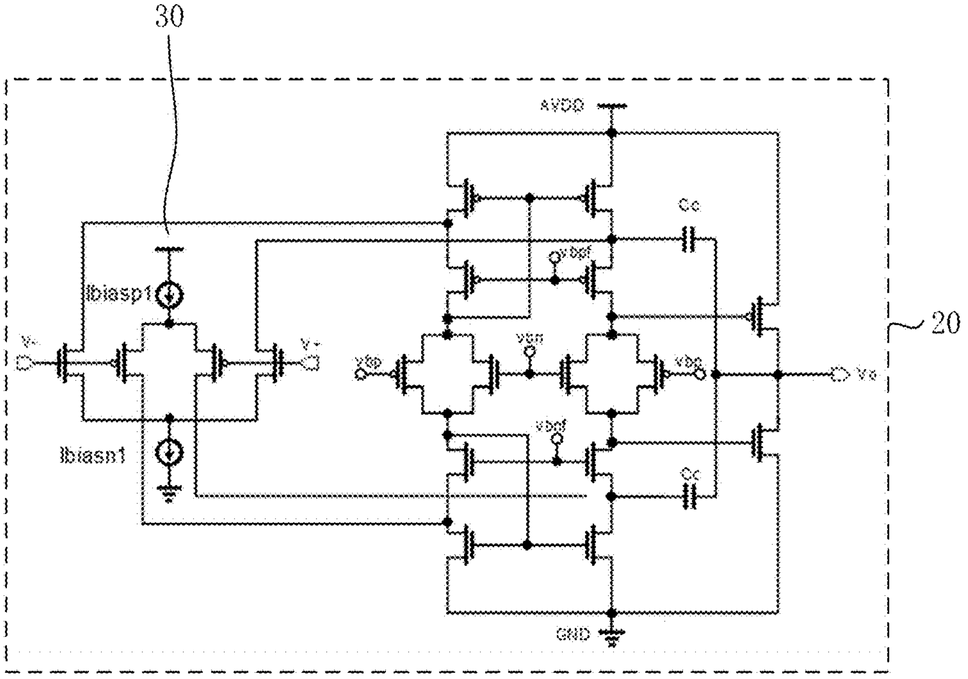
FIG. 2 is a circuit diagram of a source amplifier structure in the related technology.
Figure 3:
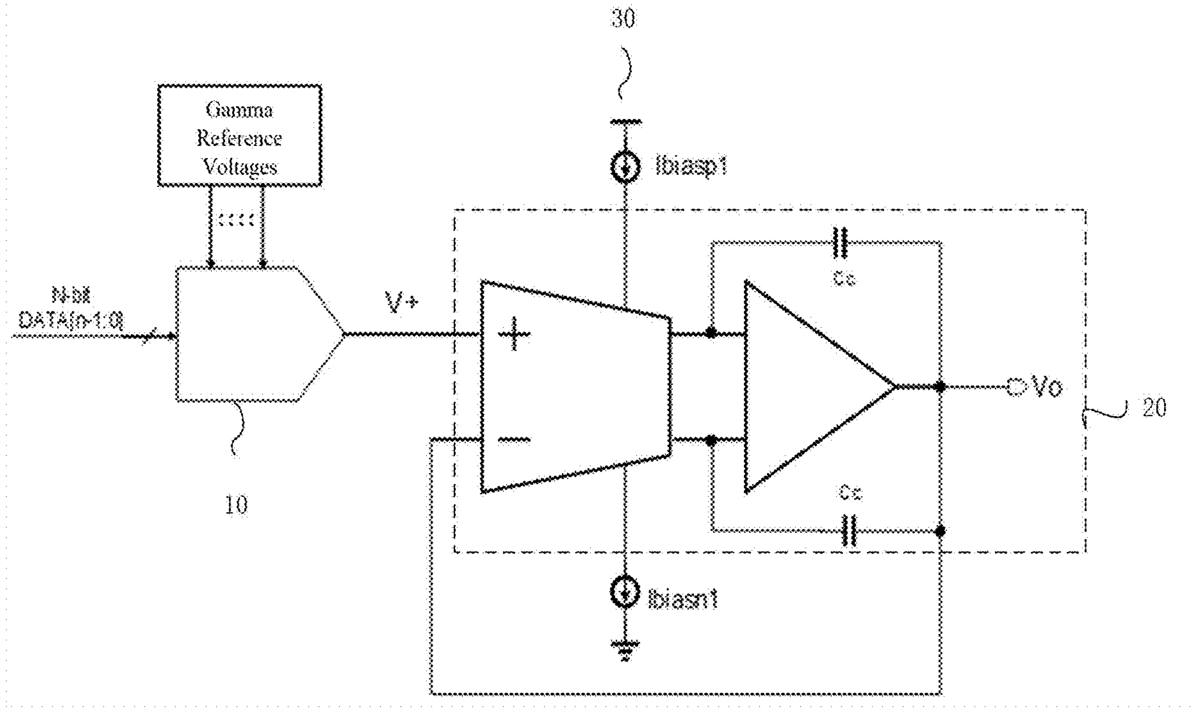
FIG. 3 is a schematic diagram of a source driving circuit in the related technology.

A structure of the source amplifier is shown with reference to FIG. 2. The rail-to-rail input can enable the amplifier to receive an input voltage within a larger voltage range, and the Class AB output structure can provide a relatively strong driving capability. The structure of the source amplifier can be simplified as shown in FIG. 3. Grayscale value DATA [n−1:0] of N-bit is subjected to GAMMA nonlinear conversion to generate a grayscale voltage V+, and the grayscale voltage V+ serves as an input signal to an input terminal "+" of the differential amplifier. An output voltage Vo of the amplifier is used to drive pixel units of the panel. An output terminal of the amplifier is connected with an input terminal "−" of the amplifier; therefore, a unity gain amplifier is formed, which can improve the driving capability of the grayscale voltage.

A slew rate (SR) is an important parameter for describing a voltage slewing rate in a circuit. It refers to a maximum rate at which an output signal can change along with an input signal per unit time (typically microsecond). The slew rate is typically in units of V/s (volts per second) or V/μs (volts per microsecond), representing a maximum voltage value that the output signal can vary with the input signal per second or per microsecond. In the circuit, slew rate is a very important parameter because it directly affects the performance and stability of the circuit. If the slew rate of the circuit is too low, the output signal cannot timely vary with the input signal, resulting in signal distortion and increased error. In general, high-speed and high-precision circuits need to have higher voltage slew rates to ensure signal accuracy and reliability.

In the source amplifier structure shown in FIG. 3, several factors related to the slew rate include: a bias tail current Ibiasp1/Ibiasn1, a compensation capacitor Cc, and a driving capability of an output stage itself. The larger the bias tail current is, the faster a charging and discharging speed of the compensation capacitor Cc is, and the higher the slew rate is; the smaller the compensation capacitor Cc is, the shorter the time for the amplifier to complete charging and discharging level stabilization of the compensation capacitor is, and the higher the slew rate is; the stronger the driving capability of the output stage is, the faster the charging and discharging for the panel capacitor is, and the higher the slew rate is. However, the above factors are themselves restricted: the larger the tail current is, the larger the power consumption of the amplifier is; the smaller the compensation capacitor Cc is, the amplifier is prone to unstable oscillation; and the higher the driving capability of the output stage is, the larger the size of the device is required, which increases the cost. Therefore, with the objective of improving the slew rate, requirements in terms of power consumption, area and stability need to be taken into account.

Figure 4:
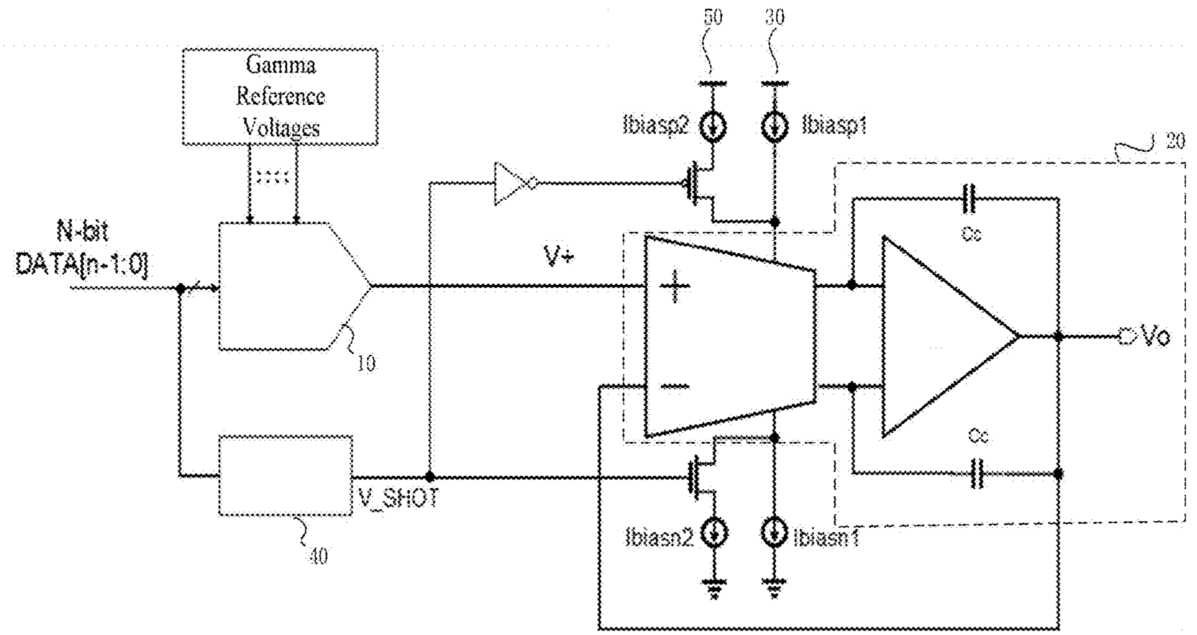
FIG. 4 is a schematic diagram of a source driving circuit in an embodiment.

In view of the above problems, the present disclosure provides a source driving circuit, as shown in FIG. 4, including:

- a DAC 10, which is configured to obtain a grayscale value and convert the grayscale value into a grayscale voltage;
- a differential amplifier 20, where a first input terminal of the differential amplifier is connected to the DAC 10 to obtain the grayscale voltage;
- a first bias circuit 30, which is configured to apply a first bias tail current to the differential amplifier 20;
- a flip-flop 40, which is connected to the DAC 10 and configured to obtain the grayscale value and a variation range of the grayscale value; and
- a second bias circuit 50, which is connected to the flip-flop 40, and configured to apply a second bias tail current to the differential amplifier 20 in response to the variation range of the grayscale value satisfying a trigger condition.

According to an embodiment, the DAC 10 is configured to convert discrete digital quantity into continuously changed analog quantity. Specifically, the DAC 10 is configured to generate a grayscale voltage V+ by performing GAMMA nonlinear conversion on N-bit grayscale value DATA [n−1:0], and the grayscale voltage V+ serves as an input signal to the first input terminal (input terminal "+") of the differential amplifier 20.

In an embodiment, the differential amplifier 20 includes an input stage module and an output stage module. The input stage module includes the first input terminal (input terminal "+") and a second input terminal (input terminal "−"), the input stage module is connected to the output stage module, and an output voltage Vo of the output stage module is configured to drive pixel units of a panel. The differential amplifier 20 further includes a compensation capacitor Cc, and the compensation capacitor Cc is disposed on a circuit that connects a midpoint between the output stage module and the output stage module to an output terminal of the output stage module. Further, the output terminal of the output stage module is connected to the second input terminal (input terminal "−") of the input stage module to form a unity gain negative feedback structure, with which the output signal can vary with the input signal, so as to drive a large capacitive load and improve the driving capability of the grayscale voltage.

In an embodiment, the first bias circuit 30 is configured to apply the first bias tail current, i.e., a fixed bias tail current, to the differential amplifier 20. Referring to FIG. 4, the first bias circuit 30 always applies a fixed bias tail current to both ends of the input stage module of the differential amplifier 20, that is, when the differential amplifier 20 is powered on for operation, the first bias circuit 30 always continuously applies the bias tail current to the differential amplifier 20, and the value of the applied first bias tail current is a fixed value, which does not change with the grayscale value or the grayscale voltage.

In an embodiment, the source driving circuit provided by the present disclosure further includes a flip-flop 40, for example, a 1-shot flip-flop. As shown in FIG. 4, an input terminal of the flip-flop 40 is configured to obtain a grayscale value, which is the same as data obtained by an input terminal of the DAC 10; and an output terminal of the flip-flop 40 is connected to the second bias circuit 50 to output a low level or a high level to the second bias circuit 50.

Exemplarily, the flip-flop 40 includes at least one determination unit. The determination unit includes a first branch and a second branch in parallel, the first branch is provided with a delay unit 41, and the first branch and the second branch input to a logic unit 42.

Exemplarily, the flip-flop 40 includes a single determination unit for determining a variation range of a highest bit of the grayscale value; or, the flip-flop 40 includes two determination units for determining variation ranges of the highest bit and a second highest bit of the grayscale value, respectively.

Further, in response to the variation range of the grayscale value satisfying the trigger condition, an output signal of the flip-flop is switched from a low level to a high level. When the output signal of the flip-flop is at the high level, the second bias tail current is applied to the differential amplifier. In response to the variation range of the grayscale value not satisfying the trigger condition, the output signal of the flip-flop is at a low level, and when the output signal of the flip-flop is at the low level, the second bias tail current is not applied to the differential amplifier. The trigger condition includes that the variation range of the grayscale value is varying between a first interval and a second interval of a grayscale voltage range, which may refer to that the grayscale value changes from a value within the first interval to a value within the second interval, or from a value within the second interval to a value within the first interval. The first interval and the second interval are of the same length.

Figure 5:
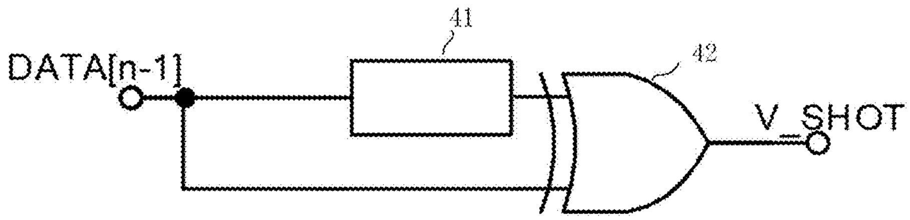
FIG. 5 is a schematic structural diagram of a flip-flop according to an embodiment.
Figure 6:
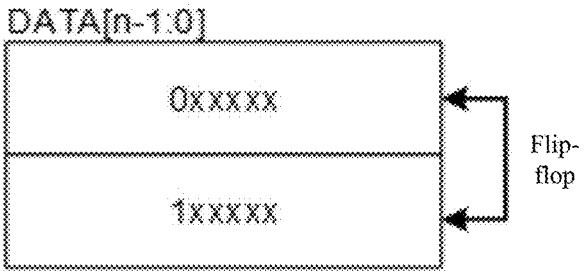
FIG. 6 is a schematic diagram of a grayscale voltage range according to an embodiment.

In an embodiment, as shown in FIG. 5, the flip-flop 40 includes a single determination unit. The determination unit includes a first branch and a second branch in parallel, and the first branch is provided with a delay unit 41. The determination unit further includes a logic unit 42, and the logic unit includes two input terminals for inputting the grayscale value from the first branch and the grayscale value from the second branch respectively. The first branch obtains a first grayscale value D1 at a first moment, and the second branch obtains a second grayscale value D2 at a second moment. The first branch is provided with the delay unit, and a time difference between the first moment and the second moment is consistent with a delay duration of the delay unit; hence, the logic unit can simultaneously obtain the first grayscale value D1 and the second grayscale value D2 to obtain the variation range of the grayscale value, and then compare the variation range of the grayscale value with a preset range. Specifically, in a case that the flip-flop 40 only includes the single determination unit, the single determination unit is configured to perform determination on the highest bit of the grayscale value. As shown in FIG. 6, the grayscale voltage range includes two intervals. For example, the first interval of the grayscale voltage range starts from 000000 and ends at 011111, and the second interval following the first interval starts from 100000 and ends at 111111. In a case that the highest bit of the first grayscale value is different from the highest bit of the second grayscale value, for example, the first grayscale value D1 is 1xxxxx and the second grayscale value D2 is 0xxxxx, the variation range of the grayscale value is from the second interval of the grayscale voltage range to the first interval. The variation range of the grayscale value is varying between the first interval and the second interval of the grayscale voltage range, so the trigger condition is satisfied, and the output voltage V_SHOT of the flip-flop 40 is switched from the low level to the high level. In a case that the highest bit of the first grayscale value is the same as the highest bit of the second grayscale value, for example, both the first grayscale value D1 and the second grayscale value D2 are 1xxxxx, the trigger condition is not satisfied, and the output voltage V_SHOT of the flip-flop 40 remains at the low level.

Figure 7:
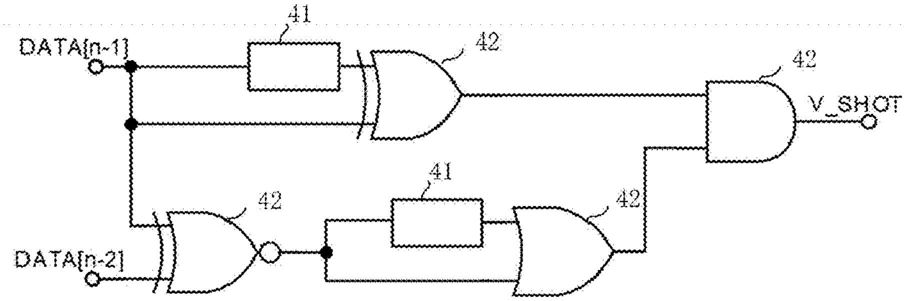
FIG. 7 is a schematic structural diagram of a flip-flop according to an embodiment.
Figure 8:
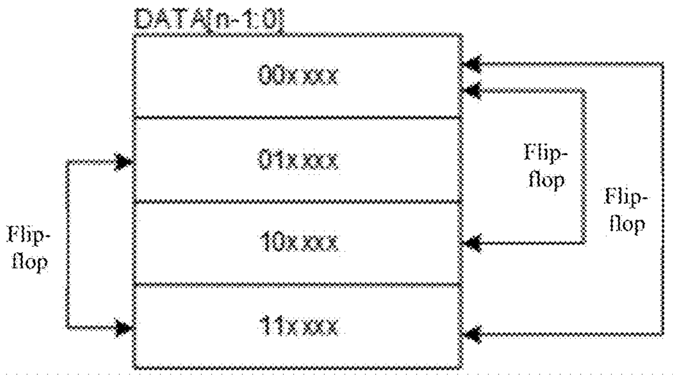
FIG. 8 is a schematic diagram of a grayscale voltage range according to an embodiment.

In an embodiment, as shown in FIG. 7, the flip-flop 40 includes two parallel determination units. A first determination unit is configured to perform determination on the highest bit of the grayscale value, and a second determination unit is configured to perform determination on the second highest bit of the grayscale value. Each determination unit includes a delay unit and a logic unit, and each determination unit further inputs into a total logic unit; in this way, variation ranges of the highest bit and the second highest bit of the grayscale value are obtained, and the variation range of the grayscale value is compared with a preset range. Specifically, in a case that the flip-flop 40 includes two determination units, the two determination units are configured to perform determination on highest two bits, i.e., the highest bit and the second highest bit, of the grayscale value. As shown in FIG. 8, the grayscale voltage range includes four sub-intervals. For example, the first interval may include a first sub-interval and a second sub-interval, and the second interval may include a third sub-interval and a fourth sub-interval. In a case that the highest bit and the second highest bit of the first grayscale value are both different from the highest bit and the second highest bit of the second grayscale value, for example, the first grayscale value D1 is 11xxxx and the second grayscale value D2 is 00xxxx, the variation range of the grayscale value is changed from the fourth sub-interval of the grayscale voltage range to the first sub-interval, the trigger condition is satisfied, and the output voltage V_SHOT of the flip-flop 40 is switched from the low level to the high level. In a case that the highest bit of the first grayscale value is different from the highest bit of the second grayscale value and the second highest bit of the first grayscale value is the same as the second highest bit of the second grayscale value, for example, the first grayscale value D1 is 10xxxx and the second grayscale value D2 is 00xxxx, the variation range of the grayscale value is changed from the third sub-interval of the grayscale voltage range to the first sub-interval, the trigger condition is satisfied, and the output voltage V_SHOT of the flip-flop 40 is switched from the low level to the high level. In a case that the highest bit of the first grayscale value is the same as the highest bit of the second grayscale value and the second highest bit of the first grayscale value is different from the second highest bit of the second grayscale value, for example, the first grayscale value D1 is 11xxxx and the second grayscale value D2 is 10xxxx, the variation range of the grayscale value is changed from the fourth sub-interval of the grayscale voltage range to the third sub-interval, the trigger condition is not satisfied, and the output voltage V_SHOT of the flip-flop 40 is maintained at the low level. Similarly, in the case of varying between the first sub-interval and the second-interval, the trigger condition is not satisfied. Moreover, when determination is performed on both the highest bit and the second highest bit of the grayscale value, in addition to the variation range of the grayscale value varying between the first interval and the second interval of the grayscale voltage range, the trigger condition further includes that there exists at least one sub-interval between sub-intervals within which the first grayscale value D1 and the second grayscale value D2 are respectively located. Therefore, in the case of varying between the second sub-interval and the third sub-interval, the trigger condition is still not satisfied.

Exemplarily, in response to the variation range of the grayscale value satisfying the trigger condition, the flip-flop outputs a forward pulse with a width equal to the delay duration of the delay unit. Further, the single forward pulse is configured to drive the second bias circuit to apply the second bias tail current for a preset duration to the differential amplifier for a single time.

In an embodiment, the second bias circuit 50 is configured to apply the second bias tail current, i.e., an additional bias tail current, to the differential amplifier 20. Referring to FIG. 4, the second bias circuit 50 and the first bias circuit 30 converge and then are connected to both ends of the input stage module of the differential amplifier 20 to apply a sum of the first bias tail current and the second bias tail current to the differential amplifier 20. Since the first bias tail current is a fixed bias tail current, a total bias tail current applied to the differential amplifier 20 varies with the second bias tail current.

In an embodiment, in a case that the variation range of the grayscale value satisfies the trigger condition, for example, the grayscale voltage varies from a low half to a high half, or from the high half to the low half, the output voltage V_SHOT of the flip-flop 40 is a forward pulse, and the width of the forward pulse is equal to the delay duration t_delay of the delay unit. This forward pulse may drive the second bias circuit 50 on, to apply the second bias tail current to the differential amplifier 20. Each time the flip-flop 40 outputs a forward pulse, the second bias circuit 50 is turned on once to apply the second bias tail current to the differential amplifier 20, and the width of the forward pulse is equal to the delay duration of the delay unit, so a duration of applying the second bias tail current to the differential amplifier 20 by the second bias circuit 50 is the delay duration t_delay of the delay unit.

By applying the additional bias tail current to the differential amplifier 20, the total bias tail current applied to the differential amplifier 20 is increased, and the increased bias tail current can drive the compensation capacitor Cc to complete voltage change more quickly, thereby improving the slew rate of the differential amplifier.

Exemplarily, after the high level lasts for a preset duration, the output signal of the flip-flop is switched from the high level to the low level.

In an embodiment, the width of the forward pulse is equal to the delay duration t_delay of the delay unit, the forward pulse can drive the second bias circuit 50 to be turned on to apply the second bias tail current to the differential amplifier 20, and when a duration in which the second bias circuit 50 applies the second bias tail current to the differential amplifier 20 reaches the delay duration t_delay, the second bias circuit 50 is turned off, the second bias tail current is no longer applied to the differential amplifier 20, and only the first bias circuit 30 continues to apply the first bias tail current to the differential amplifier 20. In this way, after a slew rate enhancement stage, the low level is restored, and the differential amplifier 20 restores to the initial fixed bias tail current to save static power consumption.

Usually, the fixed bias current is increased or a transient enhanced analog circuit is added in the amplifier, to enhance the slew rate of the source amplifier. However, increase of the fixed bias current may result in increase of the power consumption of the amplifier, and the analog circuit has a complex structure and may also increase the circuit area. In the present disclosure, an additional bias tail current is generated through the cooperative control of the delay unit and the logic unit, so as to provide a large charging and discharging current in a grayscale variation stage; consequently, the slew rate is enhanced while the power is not significantly increased, thereby achieving the balance between the slew rate and the power consumption. The delay unit and the logic unit have simple structures, which avoids increased area of the chip occupied by the source driving circuit.

Figure 9:
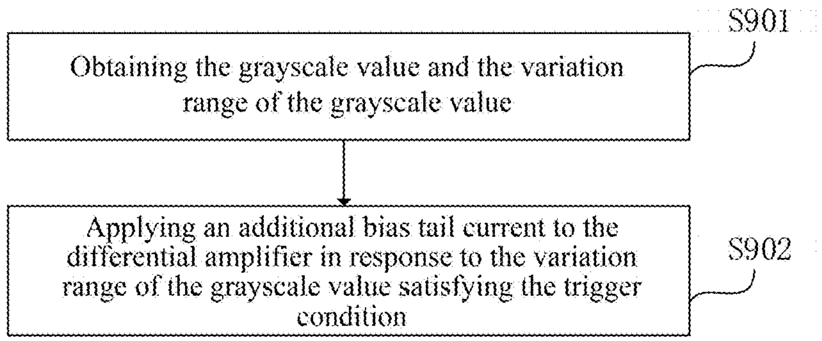
FIG. 9 is a flowchart of a method for adjusting a source driving circuit in an embodiment.

The present disclosure further provides a method for adjusting a source driving circuit, which is applied to the above-mentioned source driving circuit. As shown in FIG. 9, the method includes the following steps:

step S901: obtaining a grayscale value and a variation range of the grayscale value;

Step S902: applying an additional bias tail current to the differential amplifier in response to the variation range of the grayscale value satisfying a trigger condition.

In an embodiment, when the source driving circuit is powered on, the DAC 10 generates a grayscale voltage V+ by performing GAMMA nonlinear conversion on N-bit grayscale value DATA [n−1:0], and the grayscale voltage V+ is input to a first input terminal (input terminal "+") of the differential amplifier 20, an output terminal of the differential amplifier 20 generates an output voltage Vo, and the output voltage Vo of the differential amplifier 20 is input to a second input terminal (input terminal "−") of the differential amplifier 20. The first bias circuit 30 applies a fixed bias tail current to the differential amplifier 20.

Next, step S901 is performed to obtain a grayscale value and a variation range of the grayscale value. Obtaining the variation range of the grayscale value includes: obtaining a delayed first grayscale value and an undelayed second grayscale value; and obtaining the variation range of the grayscale value based on the first grayscale value and the second grayscale value.

In an embodiment, determination is performed on only a highest bit of the grayscale value. As shown in FIG. 6, a grayscale voltage range includes two intervals. A first interval and a second interval of the grayscale voltage range may be of the same length. For example, the first interval of the grayscale voltage range starts from 000000 and ends at 011111, and the second interval following the first interval starts from 100000 and ends at 111111. In a case that the highest bit of the first grayscale value is different from the highest bit of the second grayscale value, for example, the first grayscale value D1 is 1xxxxx and the second grayscale value D2 is 0xxxxx, the variation range of the grayscale value is from a second interval to a first interval of the grayscale voltage range. The variation range of the grayscale value is varying between the first interval and the second interval of the grayscale voltage range, which may refer to that the grayscale value changes from a value within the first interval to a value within the second interval, or from a value within the second interval to a value within the first interval.

In an embodiment, determination is performed on highest two bits, i.e., the highest bit and a second highest bit, of the grayscale value. As shown in FIG. 8, the grayscale voltage range includes four sub-intervals. For example, the first interval may include a first sub-interval and a second sub-interval, and the second interval may include a third sub-interval and a fourth sub-interval. In a case that the highest bit and the second highest bit of the first grayscale value are both different from the highest bit and the second highest bit of the second grayscale value, for example, the first grayscale value D1 is 11xxxx and the second grayscale value D2 is 00xxxx, the variation range of the grayscale value is changed from the fourth sub-interval of the grayscale voltage range to the first sub-interval, the trigger condition is satisfied. In a case that the highest bit of the first grayscale value is different from the highest bit of the second grayscale value and the second highest bit of the first grayscale value is the same as the second highest bit of the second grayscale value, for example, the first grayscale value D1 is 10xxxx and the second grayscale value D2 is 00xxxx, the variation range of the grayscale value is changed from the third sub-interval of the grayscale voltage range to the first sub-interval, the trigger condition is satisfied. In a case that the highest bit of the first grayscale value is the same as the highest bit of the second grayscale value and the second highest bit of the first grayscale value is different from the second highest bit of the second grayscale value, for example, the first grayscale value D1 is 11xxxx and the second grayscale value D2 is 10xxxx, the variation range of the grayscale value is changed from the fourth sub-interval of the grayscale voltage range to the third sub-interval, the trigger condition is not satisfied. Similarly, in the case of varying between the first sub-interval and the second-interval, the trigger condition is not satisfied. Moreover, when determination is performed on both the highest bit and the second highest bit of the grayscale value, in addition to the variation range of the grayscale value varying between the first interval and the second interval of the grayscale voltage range, the trigger condition further includes that there exists at least one sub-interval between sub-intervals within which the first grayscale value and the second grayscale value are respectively located. Therefore, in the case of varying between the second sub-interval and the third sub-interval, the trigger condition is still not satisfied.

Next, step S902 is performed to apply the additional bias tail current to the differential amplifier in response to the variation range of the grayscale value satisfying the trigger condition.

In an embodiment, the trigger condition is satisfied when the variation range of the grayscale value is varying between the first interval and the second interval of the grayscale voltage range. In some embodiments, the trigger condition further requires that there exists at least one sub-interval between sub-intervals within which the first grayscale value D1 and the second grayscale value D2 are respectively located. In a case that the trigger condition is satisfied, an output V_SHOT of the flip-flop 40 switches from a low level to a high level; specifically, the output V_SHOT of the flip-flop 40 is a forward pulse, and a width of the forward pulse is equal to a delay duration t_delay of the delay unit. The forward pulse may drive the second bias circuit 50 on to apply an additional bias tail current to the differential amplifier 20. Each time the flip-flop 40 outputs a forward pulse, the second bias circuit 50 is turned on once to apply the additional bias tail current to the differential amplifier 20, and the width of the forward pulse is equal to the delay duration of the delay unit, so a duration of applying the additional bias tail current to the differential amplifier 20 by the second bias circuit 50 is equal to the delay duration of the delay unit. In a case that the trigger condition is not satisfied, the output V_SHOT of the flip-flop 40 remains at the low level, and the second bias circuit 50 is not turned on.

In an embodiment, after the flip-flop 40 outputs the high level for a preset duration, the output signal of the flip-flop 40 is switched from the high level to the low level, and when the output signal of the flip-flop 40 is at the low level, no additional bias tail current is applied to the differential amplifier 20. Specifically, the width of the forward pulse output by the flip-flop 40 is equal to the delay duration t_delay of the delay unit, the forward pulse may drive the second bias circuit 50 to be turned on to apply the additional bias tail current to the differential amplifier 20, and when a duration in which the second bias circuit 50 applies the second bias tail current to the differential amplifier 20 reaches the delay duration t_delay, the second bias circuit 50 is turned off, and the second bias tail current is no longer applied to the differential amplifier 20. At this time, only the first bias circuit 30 continues to apply the first bias tail current to the differential amplifier 20. Thus, after a slew rate enhancement stage where the additional bias tail current is applied to the differential amplifier 20, the differential amplifier 20 restores to the initial fixed bias tail current.

Figure 10:
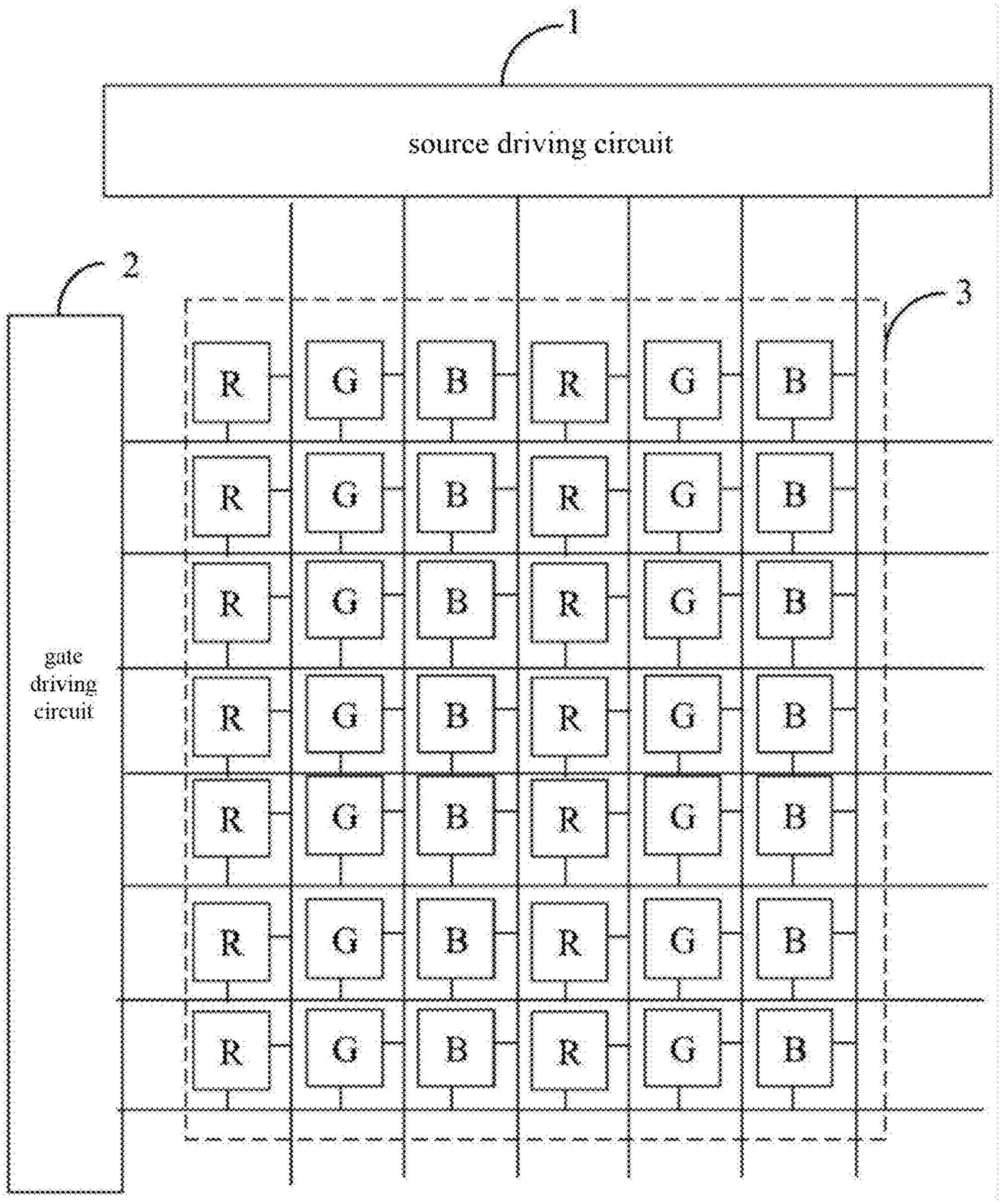
FIG. 10 is a schematic structural diagram of a display panel according to an embodiment.

The present disclosure further provides a display panel, as shown in FIG. 10, the display panel includes a source driving circuit 1, a gate driving circuit 2, and a pixel array unit 3. The gate driving circuit 2 provides scan signals to the pixel array unit 3. The source driving circuit 1 provides data signals to the pixel array unit 3. The source driving circuit 1 is the source driving circuit 1 according to the foregoing embodiments.

In an embodiment, the display panel includes a common voltage driver, a gate driver, and a source driver. The common voltage driver, which is generally an GAMMA driver, is responsible for outputting a common voltage VCOM signal; the gate driver is responsible for outputting the scan signals; and the source driver is responsible for outputting the data signals. When the display device is powered on to display, the common voltage driver, the gate driver and the source driver usually simultaneously receive an operating signal. The display panel generally further includes scan lines and data lines. When the display panel is in operation, the scan lines receive the scan signals on a driving device, thereby turning on sub-pixels row by row. At the same time, the data lines receive the data signals on the driving device, so as to charge pixel electrodes of respective sub-pixels while respective rows of sub-pixels are turned on.

In an embodiment, the pixel array unit 3 includes first pixel units, second pixel units and third pixel units corresponding to a first color, a second color and a third color, and the pixel array unit is correspondingly provided with first pixel electrodes, second pixel electrodes and third pixel electrodes. Specifically, the pixel array generally includes multiple sub-pixels of different colors, such as red sub-pixels R, green sub-pixels G, and blue sub-pixels B. Multiple sub-pixels of different colors may form a display unit. The sub-pixels of various colors in one display unit cooperate to enable the display unit to display any desired color. In addition, all the sub-pixels of the display panel are sequentially arranged in multiple rows, and each row is provided with multiple sub-pixels.

Since the display panel has the source driving circuit 1 according to the foregoing embodiments, the display panel has all the beneficial effects of the source driving circuit 1 according to the foregoing embodiments, which are not repeated here.

According to the source driving circuit and the adjusting method therefor, and the display panel provided by the present disclosure, with the arrangement of the flip-flop and the additional bias circuit, when the variation range of the grayscale value satisfies the trigger condition, the additional bias tail current is applied to the differential amplifier, thereby increasing the bias tail current for the differential amplifier and enhancing the slew rate of the differential amplifier output. Meanwhile, since the increase of the bias tail current is only effective for the preset duration, the power consumption of the driving circuit is not additionally increased, so as to meet the requirements in both enhancing the slew rate and reducing the power consumption.

It should be noted that the above embodiments are for illustrative purposes only and are not meant to limit the present disclosure.

The embodiments in this specification are all described in a progressive manner, each embodiment focuses on differences from other embodiments, and the same or similar parts between the embodiments may be referred to each other.

The technical features of the above embodiments may be combined arbitrarily, and in order to make the description concise, not all possible combinations of the technical features in the above embodiments are described, however, as long as there is no contradiction between the combinations of these technical features, it should be considered as the scope of the present specification.

The above embodiments only express several implementations of the present application, and the description thereof is specific and detailed, but cannot be understood as a limitation to the patent scope. It should be noted that for those of ordinary skill in the art, several variations and improvements can be made without departing from the concept of the present application, which all fall within the protection scope of the present application. Therefore, the protection scope of the claims should be subject to the appended claims.

What is claimed is:

1. A source driving circuit, comprising:

a Digital-to-Analog Converter (DAC), configured to obtain a grayscale value and convert the grayscale value into a grayscale voltage;

a differential amplifier, wherein a first input terminal of the differential amplifier is connected to the DAC to obtain the grayscale voltage;

a first bias circuit, which is configured to apply a first bias tail current to the differential amplifier;

a flip-flop, which is connected to the DAC and configured to obtain the grayscale value and a variation range of the grayscale value; and a second bias circuit, which is connected to the flip-flop and configured to apply a second bias tail current to the differential amplifier in response to the variation range of the grayscale value satisfying a trigger condition.

2. The source driving circuit according to claim 1, wherein the flip-flop comprises at least one determination unit, each determination unit comprising a first branch and a second branch in parallel, wherein the first branch is provided with a delay unit, and the first branch and the second branch input to a logic unit.

3. The source driving circuit according to claim 2, wherein the flip-flop comprises a single determination unit for determining a variation range of a highest bit of the grayscale value; or the trigger comprises two determination units, which are respectively configured to determine variation ranges of the highest bit and a second highest bit of the grayscale value.

4. The source driving circuit according to claim 3, wherein the trigger condition comprises that the variation range of the grayscale value is varying between a first interval and a second interval of the grayscale voltage range.

5. The source driving circuit according to claim 2, wherein in response to the variation range of the grayscale value satisfying the trigger condition, the flip-flop outputs a forward pulse having a width equal to a delay duration of the delay unit.

6. The source driving circuit according to claim 5, wherein a single forward pulse is configured to drive the second bias circuit to apply the second bias tail current to the differential amplifier for a single time, and a duration of applying the second bias tail current is equal to the delay duration.

7. The source driving circuit according to claim 1, wherein in response to the variation range of the grayscale value satisfying the trigger condition, an output signal of the flip-flop is switched from a low level to a high level, and when the output signal of the flip-flop is at the high level, the second bias tail current is applied to the differential amplifier;

in response to the variation range of the grayscale value not satisfying the trigger condition, the output signal of the flip-flop is at a low level, and when the output signal of the flip-flop is at the low level, the second bias tail current is not applied to the differential amplifier.

8. The source driving circuit according to claim 7, wherein after the high level lasts for a preset duration, the output signal of the flip-flop is switched from the high level to the low level.

9. A method for adjusting a source driving circuit, wherein the source driving circuit comprises:

a Digital-to-Analog Converter (DAC), configured to obtain a grayscale value and convert the grayscale value into a grayscale voltage;

a differential amplifier, wherein a first input terminal of the differential amplifier is connected to the DAC to obtain the grayscale voltage;

a first bias circuit, which is configured to apply a first bias tail current to the differential amplifier;

a flip-flop, which is connected to the DAC and configured to obtain the grayscale value and a variation range of the grayscale value; and a second bias circuit, which is connected to the flip-flop and configured to apply a second bias tail current to the differential amplifier in response to the variation range of the grayscale value satisfying a trigger condition, wherein the method comprises:

obtaining the grayscale value and the variation range of the grayscale value; and applying an additional bias tail current to the differential amplifier in response to the variation range of the grayscale value satisfying the trigger condition.

10. A display panel, comprising a source driving circuit, wherein the source driving circuit comprises:

a Digital-to-Analog Converter (DAC), configured to obtain a grayscale value and convert the grayscale value into a grayscale voltage;

a differential amplifier, wherein a first input terminal of the differential amplifier is connected to the DAC to obtain the grayscale voltage;

a first bias circuit, which is configured to apply a first bias tail current to the differential amplifier;

a flip-flop, which is connected to the DAC and configured to obtain the grayscale value and a variation range of the grayscale value; and a second bias circuit, which is connected to the flip-flop and configured to apply a second bias tail current to the differential amplifier in response to the variation range of the grayscale value satisfying a trigger condition.

11. The display panel according to claim 10, wherein the flip-flop comprises at least one determination unit, each determination unit comprising a first branch and a second branch in parallel, wherein the first branch is provided with a delay unit, and the first branch and the second branch input to a logic unit.

12. The display panel according to claim 11, wherein the flip-flop comprises a single determination unit for determining a variation range of a highest bit of the grayscale value; or the trigger comprises two determination units, which are respectively configured to determine variation ranges of the highest bit and a second highest bit of the grayscale value.

13. The display panel according to claim 12, wherein the trigger condition comprises that the variation range of the grayscale value is varying between a first interval and a second interval of the grayscale voltage range.

14. The display panel according to claim 11, wherein in response to the variation range of the grayscale value satisfying the trigger condition, the flip-flop outputs a forward pulse having a width equal to a delay duration of the delay unit.

15. The display panel according to claim 14, wherein a single forward pulse is configured to drive the second bias circuit to apply the second bias tail current to the differential amplifier for a single time, and a duration of applying the second bias tail current is equal to the delay duration.

16. The display panel according to claim 10, wherein in response to the variation range of the grayscale value satisfying the trigger condition, an output signal of the flip-flop is switched from a low level to a high level, and when the output signal of the flip-flop is at the high level, the second bias tail current is applied to the differential amplifier;

in response to the variation range of the grayscale value not satisfying the trigger condition, the output signal of the flip-flop is at a low level, and when the output signal of the flip-flop is at the low level, the second bias tail current is not applied to the differential amplifier.

17. The display panel according to claim 16, wherein after the high level lasts for a preset duration, the output signal of the flip-flop is switched from the high level to the low level.

* * * * *